United States Patent
Merkin et al.

(10) Patent No.: US 7,373,308 B2
(45) Date of Patent: May 13, 2008

(54) COMPUTER SYSTEM WARRANTY UPGRADE METHOD WITH CONFIGURATION CHANGE DETECTION FEATURE

(75) Inventors: Cynthia M Merkin, Georgetown, TX (US); Steven Stubbs, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1031 days.

(21) Appl. No.: 09/977,777

(22) Filed: Oct. 15, 2001

(65) Prior Publication Data

US 2003/0074230 A1 Apr. 17, 2003

(51) Int. Cl.
*G06Q 40/00* (2006.01)
(52) U.S. Cl. .......................................................... 705/4
(58) Field of Classification Search .................... 705/4, 705/1, 27; 726/26; 707/201
See application file for complete search history.

(56) References Cited

U.S. PATENT DOCUMENTS

| | | | |
|---|---|---|---|
| 5,016,171 A | | 5/1991 | Connolly et al. |
| 5,274,830 A | | 12/1993 | Asano |
| 5,410,726 A | * | 4/1995 | Baqai et al. ................. 713/100 |
| 5,983,369 A | * | 11/1999 | Bakoglu et al. .............. 714/46 |
| 6,003,808 A | | 12/1999 | Nguyen et al. |
| 6,031,621 A | * | 2/2000 | Binder ......................... 358/1.1 |
| 6,032,257 A | * | 2/2000 | Olarig et al. .................. 726/35 |
| 6,125,312 A | | 9/2000 | Nguyen et al. |
| 6,163,693 A | | 12/2000 | Rydbeck |
| 6,170,742 B1 | * | 1/2001 | Yacoob ....................... 235/375 |
| 6,182,048 B1 | * | 1/2001 | Osborn et al. .................. 705/4 |
| 6,208,853 B1 | * | 3/2001 | LoVasco et al. .......... 455/414.1 |
| 6,240,286 B1 | | 5/2001 | Rydbeck |
| 6,609,050 B2 | * | 8/2003 | Li ................................ 701/29 |
| 6,629,054 B2 | * | 9/2003 | Makhija et al. ............. 702/113 |
| 6,810,406 B2 | * | 10/2004 | Schlabach et al. .......... 707/201 |
| 6,826,539 B2 | * | 11/2004 | Loveland ........................ 705/7 |
| 6,904,592 B1 | * | 6/2005 | Johnson ...................... 717/168 |
| 6,934,686 B1 | * | 8/2005 | Rajagopalan .................. 705/1 |
| 7,047,565 B2 | * | 5/2006 | Piazza et al. ................. 726/26 |
| 7,266,515 B2 | * | 9/2007 | Costello et al. ............... 705/27 |
| 2001/0051884 A1 | * | 12/2001 | Wallis et al. ................... 705/4 |
| 2004/0002966 A1 | * | 1/2004 | Perkowski ..................... 707/3 |

OTHER PUBLICATIONS

Notebook Security: IBM Unveils Industry's First Notebook PCs With Radio Frequency-based Security.(ThinkPad 770Z and 600E notebook PCs)(Product Announcement), EDGE: Work-Group Computing Report, p NA, Feb. 1, 1999.*

* cited by examiner

*Primary Examiner*—Jeffrey A. Smith
*Assistant Examiner*—Russell Shay Glass
(74) *Attorney, Agent, or Firm*—Haynes and Boone, LLP

(57) ABSTRACT

A computer system warranty upgrade method and apparatus are provided. The computer system is programmed to detect a change in its configuration such as when new components are installed. When such a configuration change is detected, the computer system sends a warranty upgrade request including configuration information to a remote warranty server computer. The warranty server prepares a warranty price quote specific to the particular configuration of the requesting computer. When the quoted price is paid, the warranty server digitally signs and transmits a warranty authorization to the requesting computer. The warranty authorization includes warranty type, duration, the specific configuration warranted and an identification number unique to the requesting computer. These data are authenticated and validated by a secure processor in the requesting computer. After validation, the verified data is stored in secure storage by the secure processor.

9 Claims, 8 Drawing Sheets

COMPUTER SYSTEM WARRANTY UPGRADE METHOD WITH CONFIGURATION CHANGE DETECTION FEATURE

CROSS REFERENCE TO RELATED PATENT APPLICATION

This patent application is related to the copending, commonly assigned patent application entitled COMPUTER SYSTEM WARRANTY UPGRADE METHOD AND APPARATUS, U.S. Pat. No. 09/977,736 filed concurrently herewith.

BACKGROUND

The disclosures herein relate generally to computer systems and more particularly to upgrading the warranties associated with such systems.

Computer systems are typically sold with a base warranty that provides for repair or replacement of the system if a component of the system fails during an initial warranty period. A particular model computer system may be sold in many different configurations. For example, the processor will be available in several different clock frequencies; memory is available in many different increments; the size of disk storage will vary; and different video and audio controllers may be employed. In other words, different machines will have different field replaceable units (FRU's) or modules in their configurations. The warranty typically attaches to the system in the condition it leaves the factory, systems integrator or reseller. If a user makes changes to the configuration after sale, it is possible that the initial warranty will be void or will not cover the new configuration.

However, customers do in fact frequently make changes to the system configuration after sale. For example, a larger hard disk drive or a higher performance video card may be added. This presents a problem when the user approaches the seller asking for an upgraded warranty covering the new configuration. A question immediately arises as to what the price of the upgraded warranty should be. One typical approach is a "one size fits all" upgraded warranty price. In that case, a single warranty price is quoted that is the same for all configurations of a particular model computer system even though the configurations vary. Here the warranty price is based on the average of expected warranty costs spread across the many different configurations of a particular model. Unfortunately, if you guess wrong in determining the upgraded warranty price, substantial revenue can be lost.

Another problem associated with warranties is fraud. It is difficult to track exactly which FRU's or modules a customer has in a machine. In the past a number uniquely associated with a particular machine, for example an Express Service Code number or Service Tag number, was stored together with some configuration information by the seller. An unscrupulous user may make changes to the computer system configuration and then call the computer seller and attempt to obtain service on components not originally in the system. When the customer has paid for a warranty upgrade covering components not originally in the system as sold, it is a challenging problem to know which particular components, modules or FRU's are in the upgraded system.

Still another problem associated with warranty upgrades is that some users do not know that a warranty upgrade is needed when a configuration change is made. Also, unless a user keeps scrupulous notes, the user may not recall all configuration changes made prior to calling for warranty service on the current configuration.

What is needed is a method of more accurately determining warranty cost when a warranty upgrade is requested. A method of reminding users of the need for a warranty upgrade is also desired. Moreover it is desirable that such methodology minimize the likelihood of fraud.

SUMMARY

Accordingly, in one embodiment a method is provided for upgrading the warranty of a computer system including a plurality of components in a configuration. The computer system detects changes made to its configuration. The computer system sends a warranty upgrade request to a remote warranty processor when such a change in the configuration of the computer system is detected. The warranty upgrade request includes configuration information for the computer system that was upgraded or changed.

In another embodiment, a method is provided for upgrading the warranty of a computer system including a plurality of components in a configuration. A warranty processor receives a warranty upgrade request from the computer system. The warranty request is generated by the computer system when the computer system detects a change it its configuration. The warranty request includes configuration information for the computer system and is transmitted to the warranty processor. The warranty processor determines a warranty upgrade price dependent on the configuration information in the warranty upgrade request.

A principal advantage of this embodiment is that upgrade warranty cost is accurately determined on a computer system by computer system basis according to the particular configuration of the system for which a warranty upgrade is requested. Moreover, the user is reminded to upgrade the warranty when the computer system detects a change in its configuration.

DETAILED DESCRIPTION

Figure 1:
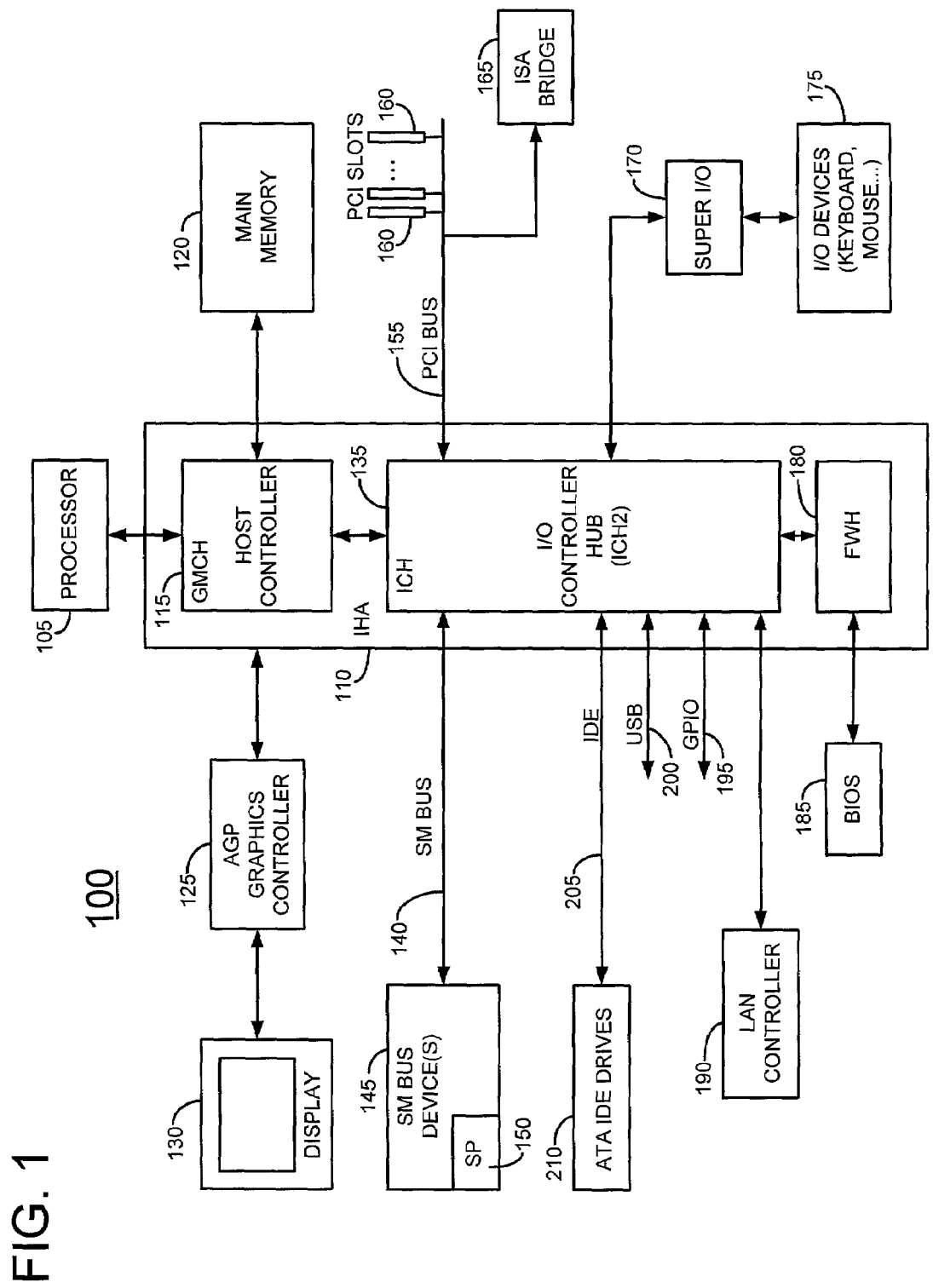
FIG. 1 shows a representative configurable electrical device on which the disclosed methodology is practiced.

FIG. 1 shows a representative configurable electrical device 100 on which the disclosed methodology is practiced. In this particular embodiment, device 100 is a computer system including numerous components, modules and FRU's which can be changed or upgraded by the user or others.

Computer system 100 includes a processor 105 which operates at one of many different selected clock speeds, for example, 1.7 GHz, 1.8 GHz and 2.0 GHz. Processors with higher clock rates tend to produce more heat. Temperature and clock rates can affect the longevity of the processor and this characteristic can be used as a factor in determining the respective warranty upgrade prices as discussed later.

An Intel Hub Architecture (IHA) chip 110 provides system 100 with memory and I/O functions. More particularly, IHA chip 110 includes a Graphics and AGP Memory Controller Hub (GMCH) 115. GMCH 115 acts as a host controller that communicates with processor 100 and further acts as a controller for main memory 120. Main memory 120 is upgradeable by the user and its size is another factor to use in determining upgrade warranty price. GMCH 115 also provides an interface to Advanced Graphics Port (AGP) controller 125 which is coupled thereto. A display 130 is coupled to AGP controller 125. Both controller 125 and display 130 are upgradeable components and these upgrades are usable as warranty price factors. For example, controller 125 is replaceable by a video graphics controller with higher memory and resolution than the original controller. Likewise, display 130 can be replaced with a monitor exhibiting higher resolution and/or increased screen size. The respective cost of these upgraded components as well as their failure rates are factors usable in determining the upgrade warranty price for a particular system configuration.

IHA chip 110 further includes an I/O Controller Hub (ICH) 135 which performs numerous I/O functions. ICH 135 is coupled to a System Management Bus (SMBus) 140 which is coupled to one or more SM Bus devices 145. A secured processor (SP) 150 for securely storing authorized warranty information is one of these SM Bus devices 145 as will be described later in more detail.

ICH 135 is coupled to a Peripheral Component Interconnect (PCI) bus 155 and PCI slots 160. An Industry Standard Architecture (ISA) bridge 165 is coupled to PCI bus 155 to provide ISA bus compatibility if desired. A Super I/O controller 170 is coupled to ICH 135 to provide connectivity to input devices such as a keyboard and mouse 175 as shown in FIG. 1.

A firmware hub (FWH) 180 is coupled to ICH 135 to provide an interface to system BIOS 185 which is coupled to FWH 180. A local area network (LAN) controller 190 is coupled to ICH 135 to provide connectivity to networking and Internet Service Provider (ISP) services. A General Purpose I/O (GPIO) bus 195 is coupled to ICH 135. Four USB ports 200 are coupled to ICH 135 as shown. USB devices such as printers, scanners, joysticks, etc. can be added to the system configuration on this bus. These USB devices can be considered part of the system configuration when determining the warranty upgrade price.

An integrated drive electronics (IDE) bus 205 is coupled to ICH 135 to connect IDE drives 210 to the computer system. The size of the IDE drives is upgradeable and is a factor in determining warranty upgrade price.

Figure 2:
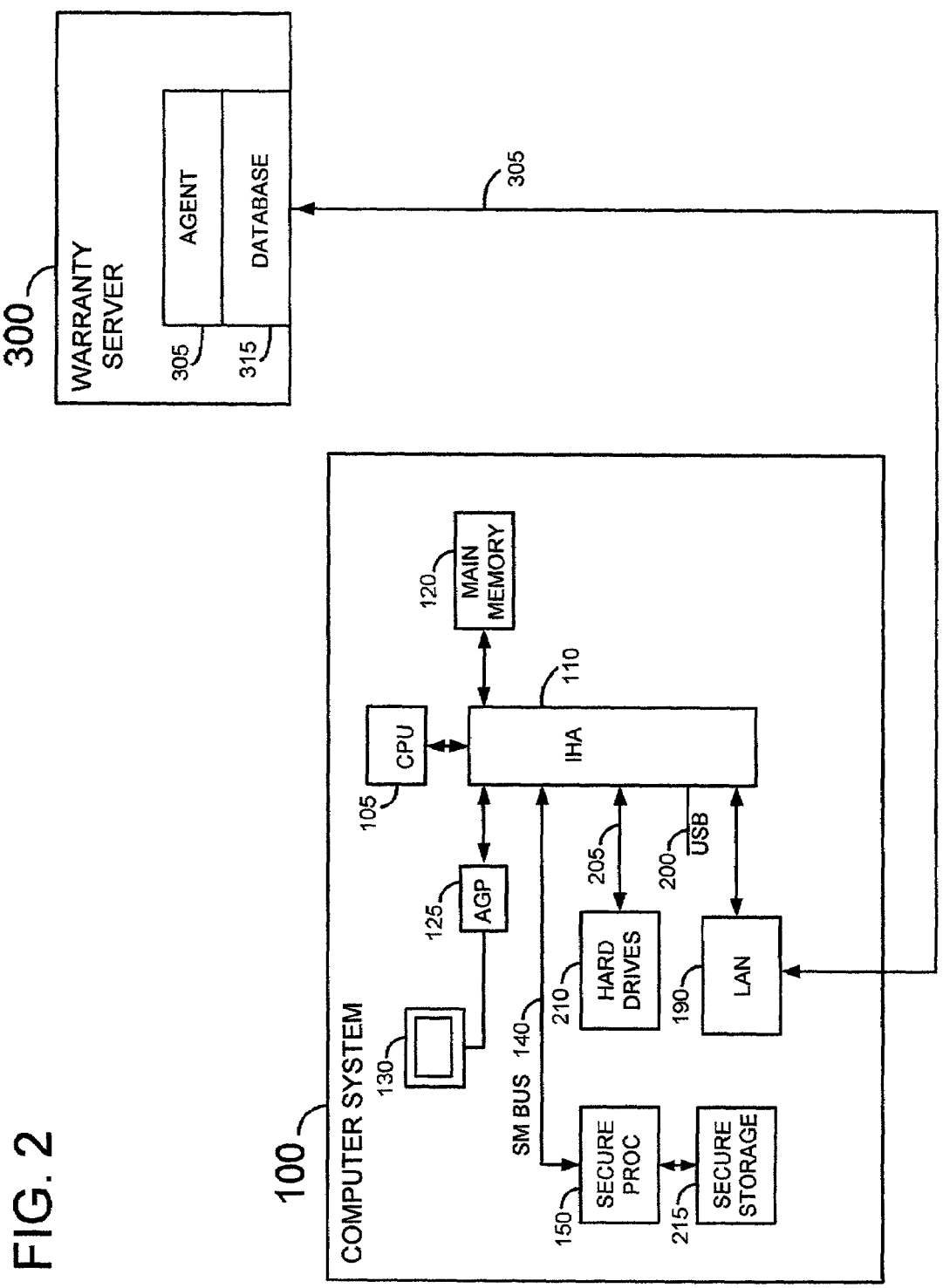
FIG. 2 is a block diagram showing a simplified view of the electrical device of FIG. 1.

FIG. 2 is a block diagram showing a simplified computer system 100 as an example of a representative electrical device for which a warranty upgrade is desired by the user or others. Computer system 100 of FIG. 2 is similar to computer system 100 of FIG. 1 except that some components have been eliminated for clarity. The secure processor 150 of computer system 100 is coupled to secure storage 215 in which a warranty authorization including warranty configuration information is stored after verification as described subsequently.

Computer system 100 is coupled via the Internet or other connective medium to a warranty processor or warranty server 300 at a remote location. Typically the warranty server resides at the computer system manufacturer, the systems integrator, the computer reseller or other warranty service provider. However, the warranty server can be located at virtually any location that makes commercial sense. The function of warranty server 300 is to receive computer configuration information from a computer system 100 or other electrical device for which an upgraded warranty is requested, to determine the price of a warranty for that system based on factors including the specific configuration of that computer system, and to transmit an approved warranty configuration back to the computer system 100 for verification and secure storage.

Figure 3:
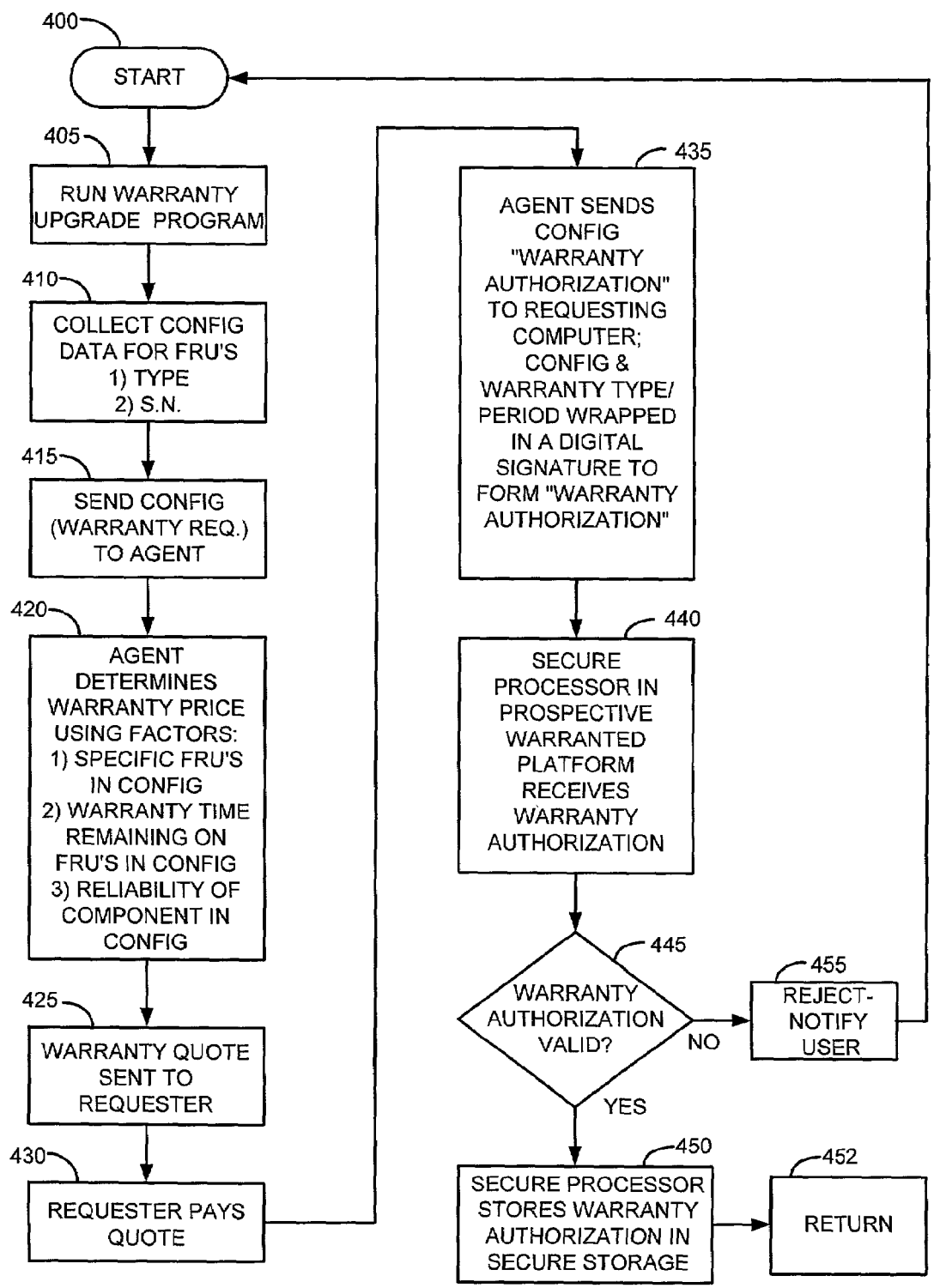
FIG. 3 is a flowchart providing more detail regarding one embodiment of the disclosed warranty upgrade process wherein the upgrade warranty request is "user initiated".

FIG. 3 is a flowchart providing more detail regarding the steps of one embodiment of the disclosed warranty upgrade request, price determination, approval and verification process. In this particular embodiment, the upgrade request is "user initiated". The warranty upgrade process commences at block 400 typically when the user (or other operator) has upgraded her computer system after purchase and desires to upgrade the computer system's warranty. As per step 405, the user then runs a warranty upgrade program on the computer for which a warranty upgrade is to be requested. This is typically initiated by selecting and clicking on a particular screen icon. The computer for which a warranty upgrade is requested is also referred to as the warranty-requesting computer, namely computer system 100.

The functions of the warranty-requesting program are now described. As per step 410, the warranty upgrade program collects configuration information regarding computer system 100 and, as per step 415, reports that information as a "warranty request" to an agent program 305 on warranty server 300. The warranty upgrade program collects identifying information with respect to each significant FRU within the particular configuration of computer system 100. For example, the upgrade program can collect the model type, revision and serial number of each FRU. This effectively forms a hardware inventory that is transmitted to warranty server 300 via communications link 315 of FIG. 2. In this manner, the warranty server is informed of the processor type, processor speed, system memory size with brand and model, hard disk drive model and capacity, CD ROM and DVD drives types and speeds, and other identifying FRU information regarding the particular configuration of computer system 100. A unique number identifying the particular computer 100 itself, for example a serial number, is included with this configuration information. All of this configuration information, or a subset thereof, forms the warranty upgrade request that is transmitted to warranty server 300.

In one embodiment, agent 305 is a software program that evaluates the inventory information sent by computer system 100 to warranty server 300. As per block 420, the agent determines a warranty price using one or more of the following factors: 1) the configuration of computer system 100, namely the specific FRU's in this particular combination of components, 2) any warranty time remaining on articles in the configuration, 3) reliability of components in the configuration, 4) the age of components in the configuration, and 5) the replacement cost of components in the configuration.

The agent then sends back to the requesting computer system 100 a warranty quote, as per block 425, including a price for an upgraded warranty for a selected time period for this particular configuration. It should be appreciated that each configuration with its myriad of components and corresponding factors will have a unique warranty price quote.

The user of the requesting computer system (warranty requester), or someone on her behalf, then pays the quoted warranty upgrade fee as per block 430. This may be done directly by the requester's computer system 100 authorizing the agent 305 on the warranty server 300 to charge an account or credit card, or may be performed through some other fulfillment entity. Once warranty server 300 is informed that the warranty quote has been paid, the agent sends a "warranty authorization" to requesting computer system 100 as per block 435. To accomplish this, the quoted configuration (FRU inventory), warranty type and time period are wrapped with a digital signature to actually form the "warranty authorization" that is sent to the requesting computer. The unique identification number of the requesting computer (e.g. serial number) is also included in the warranty authorization. This signed warranty authorization now represents the customer's warranty rights for the particular configuration contained therein.

As per block 440, secure processor 150 on requesting computer system 100 receives the warranty authorization. Secure processor 150 then tests the warranty authorization to see if it is valid. To test the digitally signed warranty authorization for validity (block 445), secure processor 150 first verifies the digital signature for the warranty authorization. If the signature is not valid, then the warranty upgrade is rejected as per block 455 and process flow continues back to START block 400 at which the warranty upgrade program can be run again at a later time. If the signature is valid, secure processor 150 then compares the quoted configuration (inventory) in the warranty authorization received from warranty server 300 with the actual configuration of requesting computer system 100. If these two match, then the warranty authorization is valid and secure processor 150 stores the warranty authorization in secure storage 215 as per block 450. If the quoted configuration does not match the actual configuration, then the warranty upgrade is rejected as per block 455 and process flow continues back to START block 400 at which the warranty upgrade program can be run again at a later time.

Communications link 315 is conveniently implemented as an Internet connection between requesting computer system 100 and warranty server 300. However other communications links may be employed as well, such as electromagnetic, radio frequency, cable and optical links for example.

Figure 4:
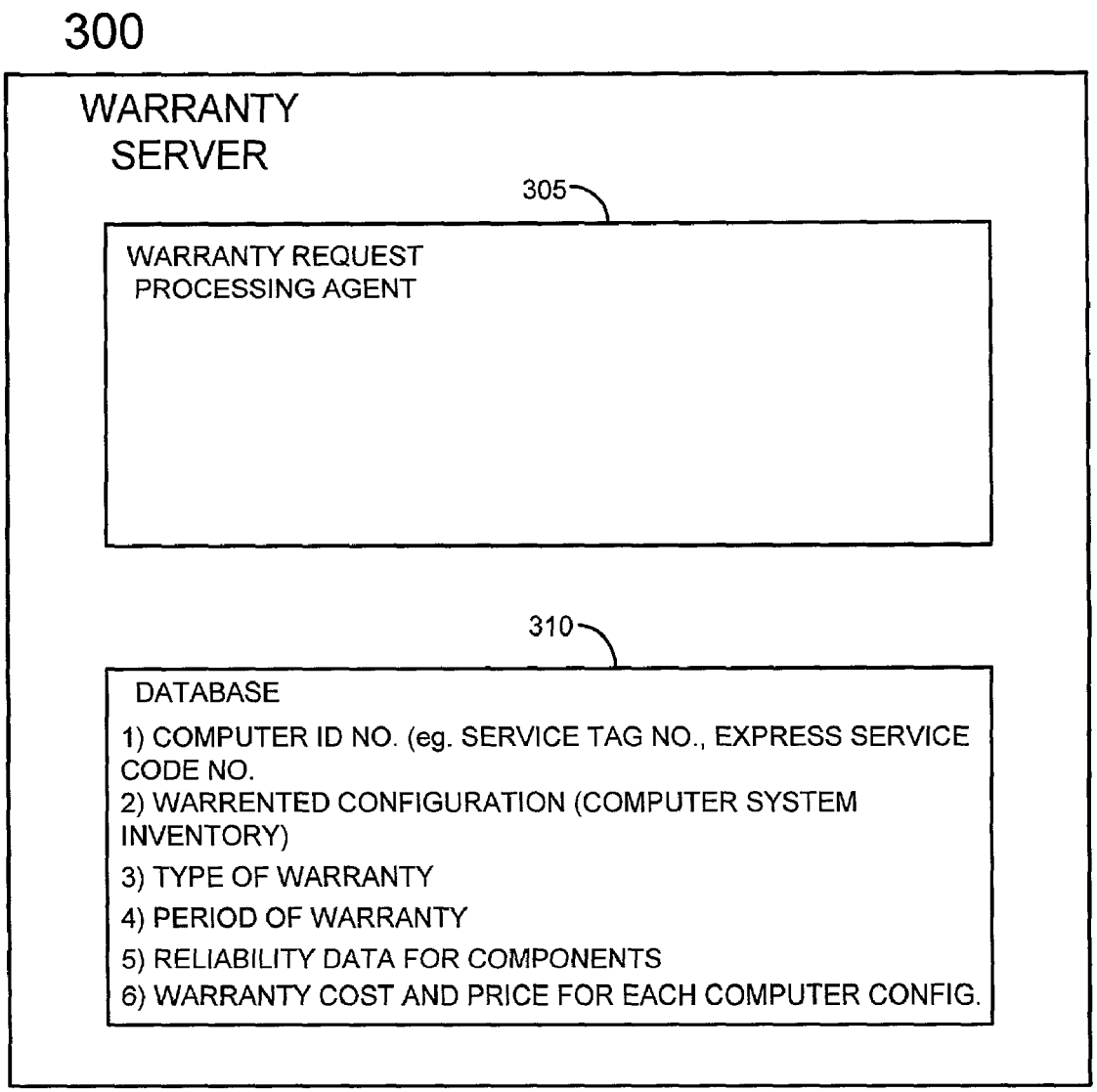
FIG. 4 is an embodiment of a block diagram of the warranty server employed by the disclosed methodology.

FIG. 4 provides more information with respect to the warranty information stored on warranty server 300 after a warranty transaction is completed. More particularly, for each warranted computer system 100, warranty server 300 stores a unique computer ID number, for example a serial number, a Service Tag number or an Express Service Code number. The specifics of the warranted configuration are also stored, namely the inventory of FRU's or components making up the warranted computer system 100. The type of warranty is also stored, for example a parts and labor warranty or a parts-only warranty. The time period of the warranty for each computer system 100 is also stored in warranty server 300. Warranty server 300 includes or has access to a database 310 that provides reliability and warranty cost data for components in allowed configurations.

Now that warranty information for requesting computer 100 is stored in warranty server 300 and warranty authorization information including the authorized configuration is securely stored in requesting computer 100, a typical subsequent user warranty call to the warranty service provider is considered. When a customer calls the warranty service provider for warranty service for the 100 GB hard drive in her 2 GHz computer system, she is requested to provide her unique computer ID number. The warranty service provider then accesses the warranty server database 310 configuration information corresponding to that particular computer. The provider finds that the 100 GB drive is indeed contained in the warranted configuration and that the warranty period is still running. The customer is advised that the warranty covers the part and a new drive is dispatched to the customer or another service arrangement is made. In another scenario, it is possible that the customer has installed an expensive aftermarket advanced video graphics controller in her machine. This controller is not the controller included in the configuration for the upgraded warranty. The aftermarket video controller malfunctions and the customer then calls for service. In this situation, the warranty service provider accesses the database for this particular computer system and finds no such aftermarket graphics controller. The customer is politely informed that the controller is not the warranted controller. It is noted that the call by the customer to the warranty service provider could be a telephone call, or a query from the user's computer to the warranty server with an automated response being provided directly by the warranty server.

As mentioned earlier, when warranty server 300 determines the warranty price for a particular configuration, a number of factors are considered by the agent. One factor is the warranty value of any components that are already under warranty. For example, in a particular computer system 100 a first component or module may have 2 years of warranty left; a second component or module may have 1 year of warranty left; and a third component or module may have a full 3 years of warranty left. These values are factored into the warranty price determined and offered by agent 305 in warranty server 300. More particularly, when the warranty-requesting computer system 100 sends its configuration information to warranty server 300, the agent reads each component number from the configuration and associates each component with a corresponding component in its database which stores how much warranty is currently assigned to, or remaining on, such component. Also, failure rate history for certain components can be accessed in the database and used as a factor in determining the upgrade warranty price. For example, it is known that as power supplies age, their failure rate increases. If the computer system user wants to increase the warranty beyond the base warranty (the original warranty), then the failure rate of power supplies with age is a valid factor in pricing the upgrade warranty. This information would typically be used as a factor mandating an increase in the overall warranty upgrade price for a computer system with an older power supply.

The warranty request-processing agent 305 in warranty server 300 can be implemented completely in software or in software with some human oversight. When implemented completely in software, the agent 305 interprets the warranty database 310 of the warranty server in response to a warranty upgrade request from warranty requesting computer 100. The agent correlates the components of the configuration sent from warranty requesting computer 100 (namely both their piece part numbers and their serial numbers) using the factors described above to determine a unique warranty fee for a particular computer configuration. Once the warranty is priced, quoted and fulfilled as described earlier, warranty server 300 wraps the quoted configuration, warranty type and time period together with a digital signature to form the "warranty authorization" which is sent back to requesting computer 100.

A secure process in requesting computer 100 validates the "warranty authorization" and stores validated warranty information (configuration and time periods) in a secure fashion. The secure process may be implemented under security provided by the operating system or it is implemented as a secure processor 150 as described earlier. The "warranty authorization" sent from warranty server 300 to requesting computer system 100 is hashed by warranty server 300 using an algorithm such as Secure Hash Algorithm 1 (SHA-1) and that hash is then encrypted with the warranty server's private key using public key encryption methodology such as the RSA encryption method—producing a warranty authorization that is digitally signed by the warranty server. Warranty server 300 creates a digital certificate for the warranty authorization that includes the encrypted hash the hash algorithm, and the encryption algorithm.

Secure processor 150 receives the digitally signed "warranty authorization". First, secure processor 150 hashes the "warranty authorization" using the hash algorithm specified by warranty server 300 and decrypts the encrypted hash present in the digital certificate sent by warranty server 300 using the public key-private key encryption method specified in the digital certificate. Secure processor 150 then compares the calculated hash to the decrypted hash to authenticate the warranty authorization. If the two hash values match, the warranty authorization is authentic, i.e. the warranty authorization is known to have come from warranty server 300 and no information within the authorization was changed during the transmission. If the hash values do not match, the authorization is rejected by secure processor 150 as per block 455. Otherwise, the warranty information (configuration, type and time period) is then validated by comparing the warranted configuration to the actual configuration. If the warranted configuration matches the actual configuration, then the warranty authorization is deemed valid and is securely stored by secure processor 150 in secure storage 215. Secure processor 150 is designed to be inaccessible to the user of the computer. The computer user should not be able to alter the warranty information although it is permissible for the user to view the warranty information. One type of limited access secure processor which may be employed as secure processor 150 is a Trusted Computing Platform Alliance (TCPA) secure processor.

Figure 5A:
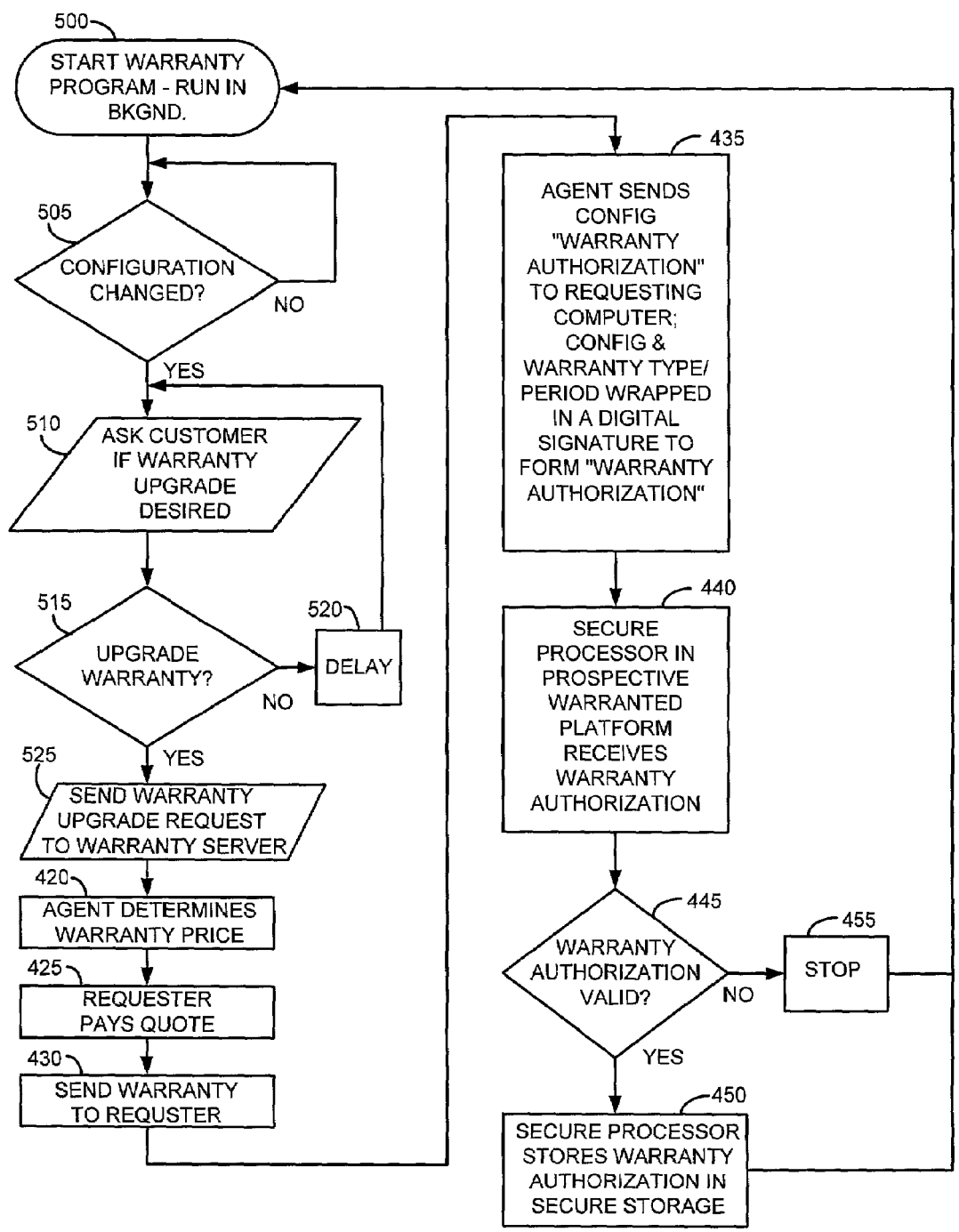
FIG. 5A is a flowchart providing more detail regarding another embodiment of the disclosed warranty upgrade process wherein the upgrade warranty request is "automatically initiated" upon configuration change.

As seen in the flow chart of FIG. 5A, another feature of the disclosed methodology involves the automatic recognition of a configuration change by computer system 100 and the provision of an option for the computer user to upgrade the warranty when a configuration change is detected. FIG. 5A details steps in the warranty upgrade program installed in computer system 100 that implement this technology. The warranty upgrade program can run in the background while other programs are executing in computer system 100 as per block 500. The program causes computer 100 to monitor for any changes in its configuration as per decision block 505. If no configuration change is found the computer continues monitoring for configuration changes. However, if a configuration change is found, for example if the user upgrades the hard drive from a 20G drive to a 100G drive, this is detected at decision block 505 and a dialog box appears on the display which asks the computer operator/user if a warranty upgrade is desired to cover the new configuration, as per block 510. Decision block 515 tests to determine if the user desires such an upgraded warranty. If the user does not want to upgrade the warranty, then a delay is imposed in block 520. At some time in the future, the user is again asked if a warranty upgrade is desired. The program provides that this feature can be optionally turned off so as to not annoy the user. The user can also set the value of the time delay provided by delay step 520. However, if decision block 515 determines that the user wants to upgrade the warranty, then a warranty upgrade request is sent to the warranty server 300 as per block 525. The content of this warranty request is substantially the same as the warranty request of step 415 described with respect to the program flow chart of FIG. 3. For example, this warranty request includes computer configuration information and an identification number unique to the particular computer system 100. After the warranty request is sent to the warranty server, warranty processing continues with steps 420-455 substantially similar to such processing in the block diagram of FIG. 3.

Figure 5B:
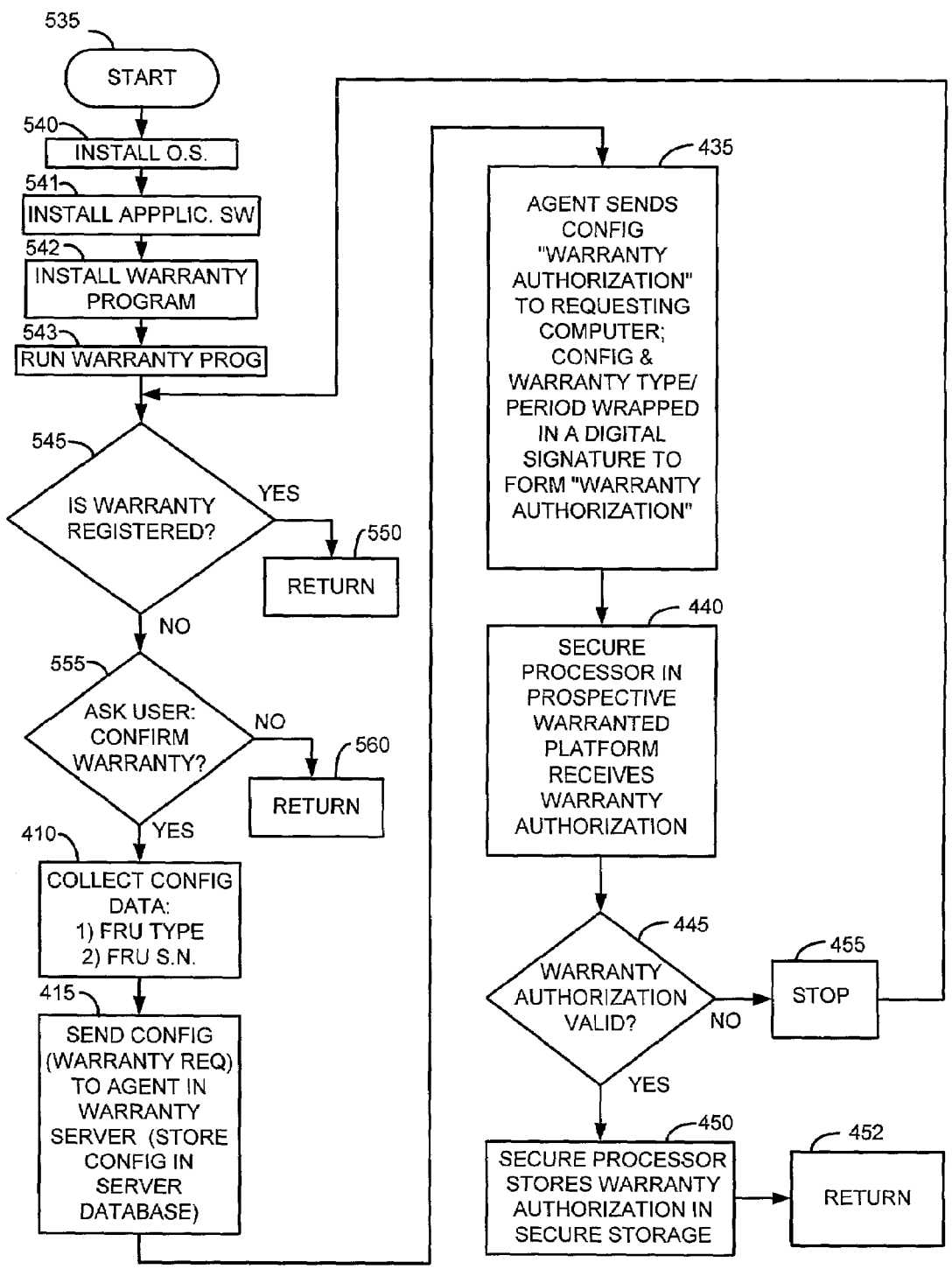
FIG. 5B is a flowchart providing more detail regarding yet another embodiment of the disclosed warranty upgrade process wherein the upgrade request is "automatically initiated" upon first computer use or a predetermined amount of time thereafter.

As seen in the flow chart of FIG. 5B, yet another feature of the disclosed methodology involves the automatic initiation of a warranty request after the first time that computer 100 is operated, i.e. when the warranty is not yet registered with the warranty server. The user is given the opportunity to opt out and not register the warranty if so desired. When computer 100 is first operated, computer operation starts at block 535 after which the operating system is installed at block 540. Application software is then installed as per block 541. The warranty program is installed at block 542 and run at block 543. The warranty program on computer 100 monitors to determine if the warranty registration has already occurred as per block 545. If it is found that the warranty has already been registered with the warranty server, then process flow returns to other machine operations as per block 550. One way for computer 100 to determine if the warranty has already been registered is to look at the contents of secure storage 215 to see if a warranty authorization is stored therein. If this is the first time that computer 100 has been operated by a user, then the lack of a warranty authorization will be detected. In this event, process flow continues to decision block 555 at which the computer outputs a user query asking the user if she wants to register the warranty with the warranty provider. If the user indicates that she does not want to register the warranty with the warranty provider, then process flow returns to other machine operations as per block 560. However, if it is found that the user wants to register the warranty, then process flow continues to block 410 at which computer configuration data is collected. From block 410 to block 452, process flow is similar to the process flow described with respect to FIG. 3, except that warranty quote step 425 and warranty quote payment step 430 are omitted. Ultimately the warranty authorization is stored in secure processor 215 and warranty registration is complete.

The above has described the operation of computer 100 after operating system installation relative to initial warranty registration. For future sessions after operating system installation, computer operation commences at block 543 such that the user is queried about warranty registration during each computer session until warranty registration occurs. To avoid user annoyance, the warranty program gives the user the opportunity to turn off the warranty registration user query if that is desired. It is noted that the warranty authorization in the secure processor could be factory installed, integrator installed, reseller installed or user installed.

Figure 6A:
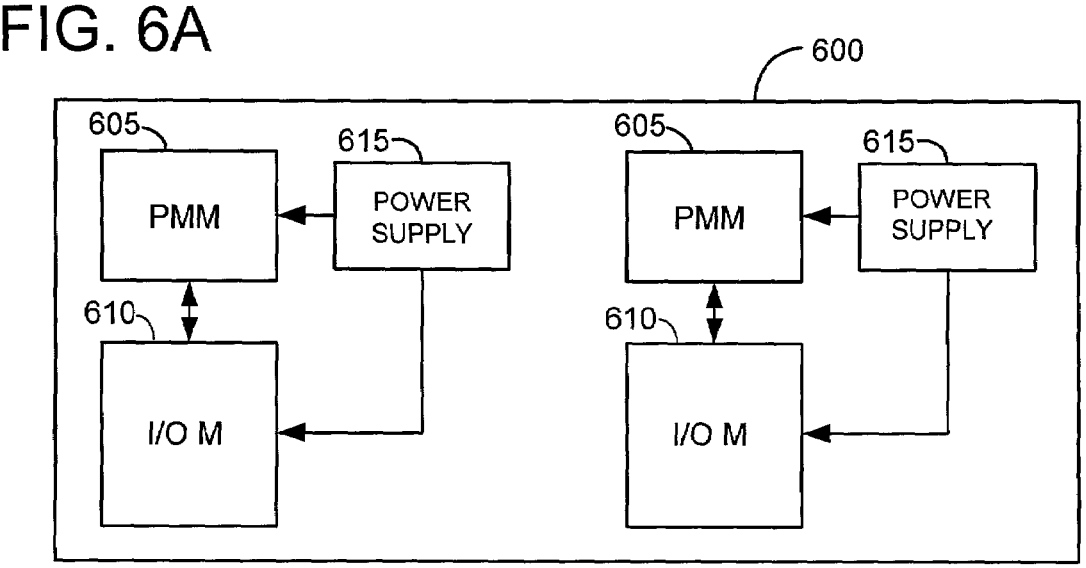
FIG. 6A is an embodiment of a block diagram of a multi-processor server computer upon which the disclosed warranty upgrade methodology is practiced.
Figure 6B:
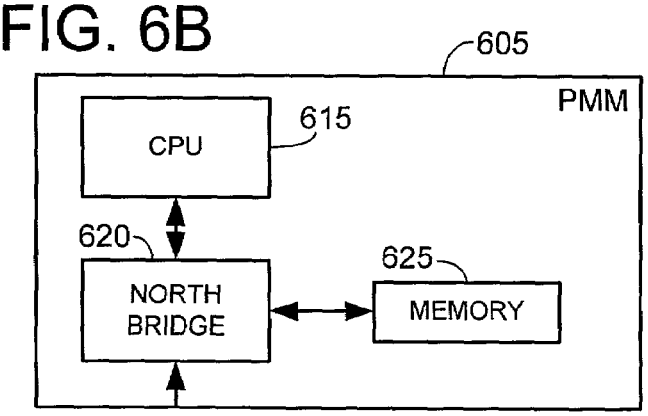
FIG. 6B is an embodiment of a block diagram of the processor memory module employed by the server computer of FIG. 6A.
Figure 6C:
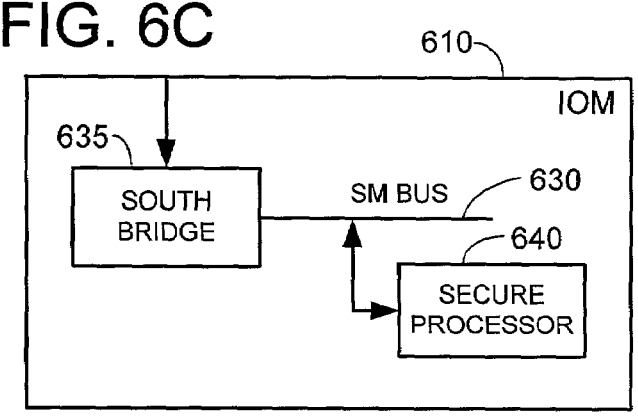
FIG. 6C is an embodiment of a block diagram of the I/O module employed by the server computer of FIG. 6A.

FIG. 6A is a block diagram of a multi-processor server computer 600 in which the disclosed warranty upgrade technology is employed. Computer 600 includes processor memory modules (PMM's) 605 respectively coupled to I/O modules (IOM's) 610. Power supplies 615 are coupled to both PMM's 605 and IOM's 610 to provide power thereto. FIG. 6B is a block diagram which shows PMM 605 in more detail. PMM 605 includes a CPU 615 coupled to an Intel Northbridge chip 620 as shown. One or more memory modules 625 are coupled to the Northbridge 620 so that memory to facilitate execution of computer programs is provided to CPU 605. FIG. 6C is a block diagram which shows IOM 610 in more detail. IOM 610 includes an Intel Southbridge chip to which SM bus 630 is coupled as shown. A secure processor 640, for example of the TCPA type discussed earlier is coupled to SM bus 640. Secure processor 640 validates and stores warranty configuration information in a secure memory (not shown in this view) as discussed earlier.

Figure 7A:
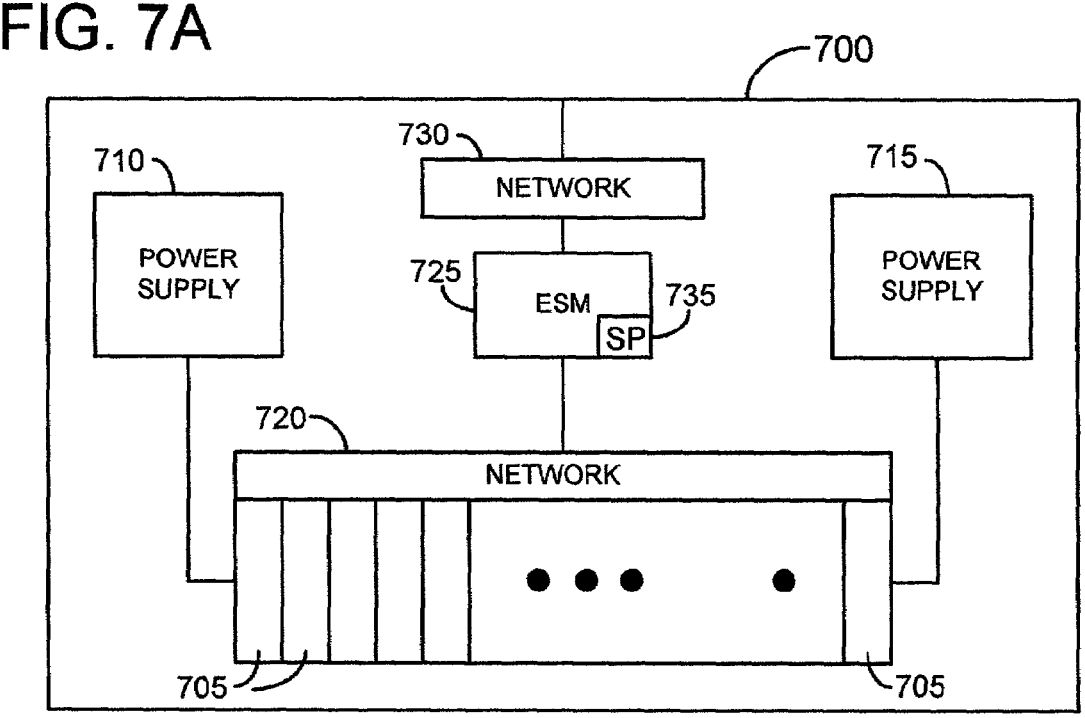
FIG. 7A is an embodiment of a block diagram of a blade server computer upon which the disclosed warranty upgrade methodology is practiced.

FIG. 7A is a block diagram of a blade server which includes multiple blade computers (blades) 705. Each blade is essentially a computer on a card. Blades 705 are all coupled to a common network interface 720. In this manner network interface 720 acts as a network concentrator to avoid a mass of I/O and power cables extending from each blade. Network interface 720 is coupled to embedded server management (ESM) module 725 which detects the installation and removal of the other modules within the chassis, and monitors the environmental characteristics (such as thermal) of the chassis.

Figure 7B:
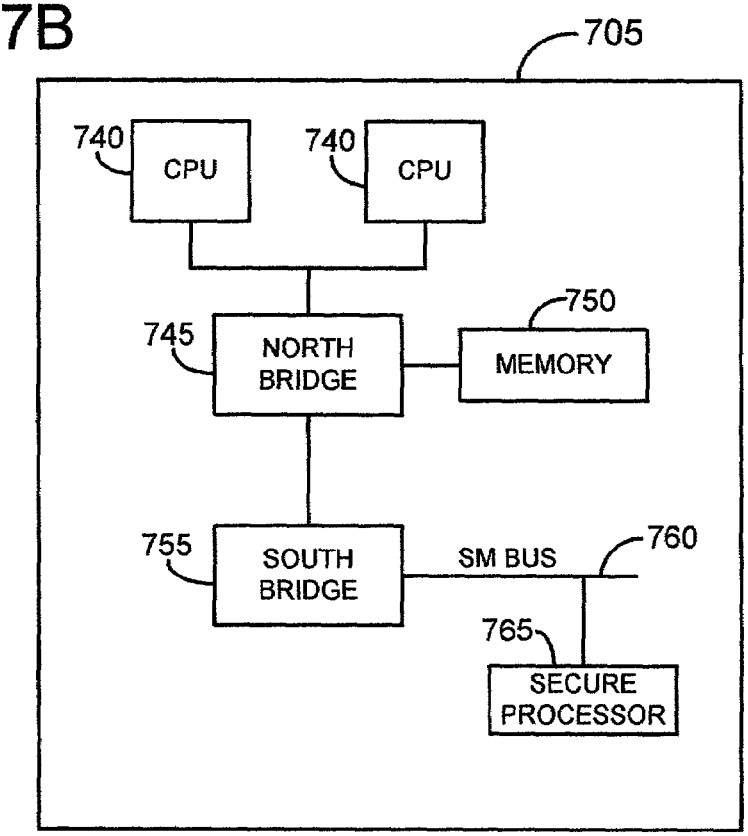
FIG. 7B is an embodiment of a block diagram of one of the blade computers employed in the computer of FIG. 7A.

In one embodiment, ESM 725 includes a secure processor 735 which performs substantially the same secure processor functions described earlier, for example, securely storing validated warranty configuration information. Secure processor (SP) 735 stores information describing the configuration of blade server 700 in a memory coupled thereto (not shown). In another embodiment, each blade 705 includes its own secure processor 765 such as shown in FIG. 7B. In more detail, blade 705 includes one or more CPU's 740 coupled to an Intel Northbridge chip 745. Northbridge chip 750 is coupled to memory 750 and to Southbridge chip 755 as shown. Southbridge chip 755 is coupled to SM bus 760. Secure processor 765 is coupled to SM bus 760 to provide blade 705 with secure storage of validated warranty configuration information in a manner whereby it cannot be compromised by the user.

Blade computers 705 are essentially self-contained computer modules each of which has a respective serial number associated therewith. These serial numbers are stored by secure processor 735 as part of the configuration information for blade server 700. Component type information is also stored by secure processor 735 with the respective component serial numbers together with the other configuration information discussed earlier. When server 700 is assembled, it is possible that some of blade computers 705 are new and some are used. Thus, some blade computers will have different warranty periods than others. When the warranty for computer 700 is registered or upgraded, the configuration information stored by secure processor 735 will include the respective warranty periods for the individual blade computers 705. Individual modules can have more than one serial number or identification number. In that case, one or both numbers are stored in the configuration information along with the respective part type and warranty period.

As can be seen, a principal advantage of these embodiments is the provision of a warranty methodology wherein the upgrade warranty cost and price for a configurable electrical device are determined based on the particular upgraded configuration of the computer to be warranted. Advantageously, this methodology reduces warranty fraud. While this novel methodology has been described with reference to a computer system which is one example of a configurable electrical device, the disclosed methodology also applies to other configurable/upgradeable electrical devices such as personal digital assistants (PDA's), cellular and other telephone devices, satellite receivers, home entertainment systems, electronic gaming equipment, configurable automotive electronic devices, etc., and combinations thereof. Such devices have become so processor dependent that they are considered to be computer systems. While in the particular embodiments shown a configuration includes hardware information, it should be appreciated that software associated with an electrical device can also be upgraded and that such software also forms part of the overall configuration to be warranted.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of upgrading the warranty of a computer system including a plurality of components in a configuration, the method comprising:

receiving from a requestor a request to upgrade an existing warranty to cover a new configuration of the computer system;

detecting, by the computer system, a configuration of the computer system;

determining if the configuration of the computer system is different than an original configuration of the computer system;

asking, by the computer system, a computer user if a warranty upgrade is desired prior to sending;

sending, by the computer system, a warranty upgrade request to a remote warranty processor, the warranty upgrade request including configuration information for field replaceable units (FRUs) in the configuration;

determining a price to upgrade the warranty, using factors related to the configuration of the computer system, wherein one or more of the said factors are selected from the group consisting of: field replaceable units in the configuration, warranty time remaining, reliability of components in the configuration, age of components in the configuration and replacement cost of components in the configuration;

communicating the price to upgrade the warranty to the requestor; and sending a warranty authorization to the computer system after acceptance of price to upgrade the warranty, wherein the warranty authorization includes a unique identification number of the computer system.

2. The method of claim 1 further comprising:

receiving, by the computer system, the price to upgrade the warranty.

3. The method of claim 1 further comprising:

receiving, by the computer system, a warranty authorization including a warranted configuration describing the configuration to be warranted.

4. The method of claim 1 further comprising:

receiving, by the computer system, a digitally signed warranty authorizing including a warranted configuration describing the configuration to be warranted.

5. The method of claim 1 wherein the warranty authorization includes warranty type information.

6. The method of claim 1 wherein the warranty authorization includes warranty duration information.

7. The method of claim 1 further comprising:

authenticating, by the computer system, a digitally signed warranty authorization.

8. The method of claim 1 further comprising:

comparing, by the computer system, a warranted configuration in a warranty authorization with the configuration of the computer system, and storing the warranty authorization in secure storage if the warranted configuration matches the configuration of the computer system.

9. The method of claim 1 wherein a secure processor in the computer system performs the comparing and storing.

* * * * *